United States Patent
Hihara

(10) Patent No.: US 11,249,753 B2
(45) Date of Patent: Feb. 15, 2022

(54) PROCESSOR ELEMENT, PROGRAMMABLE DEVICE, AND PROCESSOR ELEMENT CONTROL METHOD

(71) Applicant: NEC Space Technologies, Ltd., Tokyo (JP)

(72) Inventor: Hiroki Hihara, Tokyo (JP)

(73) Assignee: NEC SPACE TECHNOLOGIES, LTD., Tokyo (JP)

(*) Notice: Subject to any disclaimer, the term of this patent is extended or adjusted under 35 U.S.C. 154(b) by 0 days.

(21) Appl. No.: 16/641,098

(22) PCT Filed: Sep. 18, 2018

(86) PCT No.: PCT/JP2018/034379
§ 371 (c)(1),
(2) Date: Feb. 21, 2020

(87) PCT Pub. No.: WO2019/059153
PCT Pub. Date: Mar. 28, 2019

(65) Prior Publication Data
US 2020/0257526 A1 Aug. 13, 2020

(30) Foreign Application Priority Data
Sep. 25, 2017 (JP) .............................. JP2017-183690

(51) Int. Cl.
*G06F 15/76* (2006.01)
*G06F 9/30* (2018.01)

(52) U.S. Cl.
CPC ........ *G06F 9/3001* (2013.01); *G06F 9/30123* (2013.01)

(58) Field of Classification Search
CPC ........................... G06F 9/3001; G06F 9/30123
See application file for complete search history.

(56) References Cited

U.S. PATENT DOCUMENTS 7,584,446 B2 * 9/2009 Crosetto ............... G06F 9/3867
716/100
7,831,804 B2 * 11/2010 Pappalardo ........... G06F 1/3203
712/20

(Continued)

FOREIGN PATENT DOCUMENTS

EP          2306331 A1    4/2011
JP      2007-179358 A     7/2007

(Continued)

OTHER PUBLICATIONS

Written Opinion of the International Searching Authority of PCT/JP2018/034379 dated Dec. 11, 2018.

(Continued)

*Primary Examiner* — Cheng Yuan Tseng
(74) *Attorney, Agent, or Firm* — Sughrue Mion, PLLC

(57) ABSTRACT

In order to provide processor elements and programmable devices, which have little restriction on logical block arrangement and wiring, and which can improve a degree of integration, processor element 1 includes: arithmetic units 11 that perform arithmetic processing on the basis of functions which have implemented instruction sets generated in accordance with programs; registers 12 that store arguments of the functions; bypass switches 13 of the arithmetic units 11; bypass switches 14 of the registers 12; a connection setting unit 16 that switches the connections of function units 20; a multiplexer 17 that switches the input to the connection setting unit 16; a demultiplexer 18 that switches the output destination of the output from the connection setting unit 16; and a selection unit 15 that switches, in accordance with a state, the bypass switches 13, 14, the connection setting unit 16, the multiplexer 17 and the demultiplexer 18.

18 Claims, 13 Drawing Sheets

(56) References Cited

U.S. PATENT DOCUMENTS

| | | |
|---|---|---|
| 10,853,073 B2 * | 12/2020 | Fleming, Jr. .......... G06F 9/5027 |
| 2009/0249028 A1 | 10/2009 | Uhrig |
| 2010/0332795 A1 | 12/2010 | Furukawa et al. |
| 2016/0162291 A1 | 6/2016 | Toi et al. |

FOREIGN PATENT DOCUMENTS

| | | |
|---|---|---|
| JP | 2011-008519 A | 1/2011 |
| JP | 2012-221149 A | 11/2012 |

OTHER PUBLICATIONS

International Search Report of PCT/JP2018/034379 dated Dec. 11, 2018.

Extended European Search Report for EP Application No. EP18859449.3 dated Jun. 7, 2021.

* cited by examiner

PROCESSOR ELEMENT, PROGRAMMABLE DEVICE, AND PROCESSOR ELEMENT CONTROL METHOD

CROSS REFERENCE TO RELATED APPLICATIONS

This application is a National Stage of International Application No. PCT/JP2018/034379 filed Sep. 18, 2018, claiming priority based on Japanese Patent Application No. 2017-183690 filed Sep. 25, 2017, the disclosures of which are incorporated herein in their entirety by reference.

TECHNICAL FIELD

The present invention relates to a processor element, a programmable device, and a processor element control method.

BACKGROUND ART

In recent years, a programmable device such as a field programmable gate array (FPGA) and a dynamically reconfigurable processor (DRP) has been used.

For example, PTL 1 discloses a programmable device. The programmable device disclosed in PTL 1 generates a configuration code for achieving a plurality of circuits having different features, and stores the configuration code in a memory, for each task to be executed. When the programmable device operates, a circuit appropriate for causing the programmable device to execute according to an operation state of a system is selected from among the plurality of circuits having different features, and a configuration code associated with the selected circuit is loaded from the memory to the programmable device. The programmable device starts processing with respect to input data by the selected circuit at a stage when loading of the configuration code is completed.

CITATION LIST

Patent Literature

[PTL 1] Japanese Unexamined Patent Application Publication No. 2007-179358

SUMMARY OF INVENTION

Technical Problem

The programmable device is configured in such a way that logical blocks are regularly disposed and wired by a mesh data path as illustrated in FIG. 12. Such a layout becomes a constraint when a universal layout and wiring of logical blocks are performed. Such a layout of logical blocks needs a large number of wirings for transmitting a signal, and a large area for a switch region, as compared with an arithmetic element.

This also becomes a constraint in terms of improving a degree of integration. PTL 1 fails to disclose a configuration for solving such an issue.

An object of the present invention is to provide a processor element and a programmable device that enable improving a degree of integration with less constraints on a layout and wiring of logical blocks.

Solution to Problem

In one aspect of the invention, a processor element comprises: an arithmetic unit that performs arithmetic processing based on a function in which an instruction set generated according to a program is mounted; a register that stores an argument of the function; a first bypass switch that switches whether to bypass the arithmetic unit; a second bypass switch that switches whether to bypass the register; connection setting means that switches connection of function means being a pair of the register and the arithmetic unit; a multiplexer that switches an input to the connection setting means; a demultiplexer that switches an output destination of an output from the connection setting means; and selection means that performs, according to a state, switching of the first bypass switch, the second bypass switch, the connection setting means, a multiplexer, and a demultiplexer.

In one aspect of the invention, a plurality of the processor elements in a programmable device are disposed adjacent to one another, wherein processor elements that are not adjacent to one another are not directly connected, and processor elements adjacent to one another are connected to one another.

In one aspect of the invention, a control method of a processor element, comprises: performing arithmetic processing based on a function in which an instruction set generated according to a program is mounted; performing storing processing of an argument of the function; and performing, according to a state, switching whether to bypass the arithmetic processing, switching whether to bypass the storing processing, switching a sequence of function processing being a pair of the arithmetic processing and the storing processing, and switching an input to the function processing and an output destination of the function processing.

Advantageous Effects of Invention

The present invention enables improving a degree of integration with less constraints on a layout and wiring of logical blocks in a processor element and a programmable device.

EXAMPLE EMBODIMENT

Figure 1:
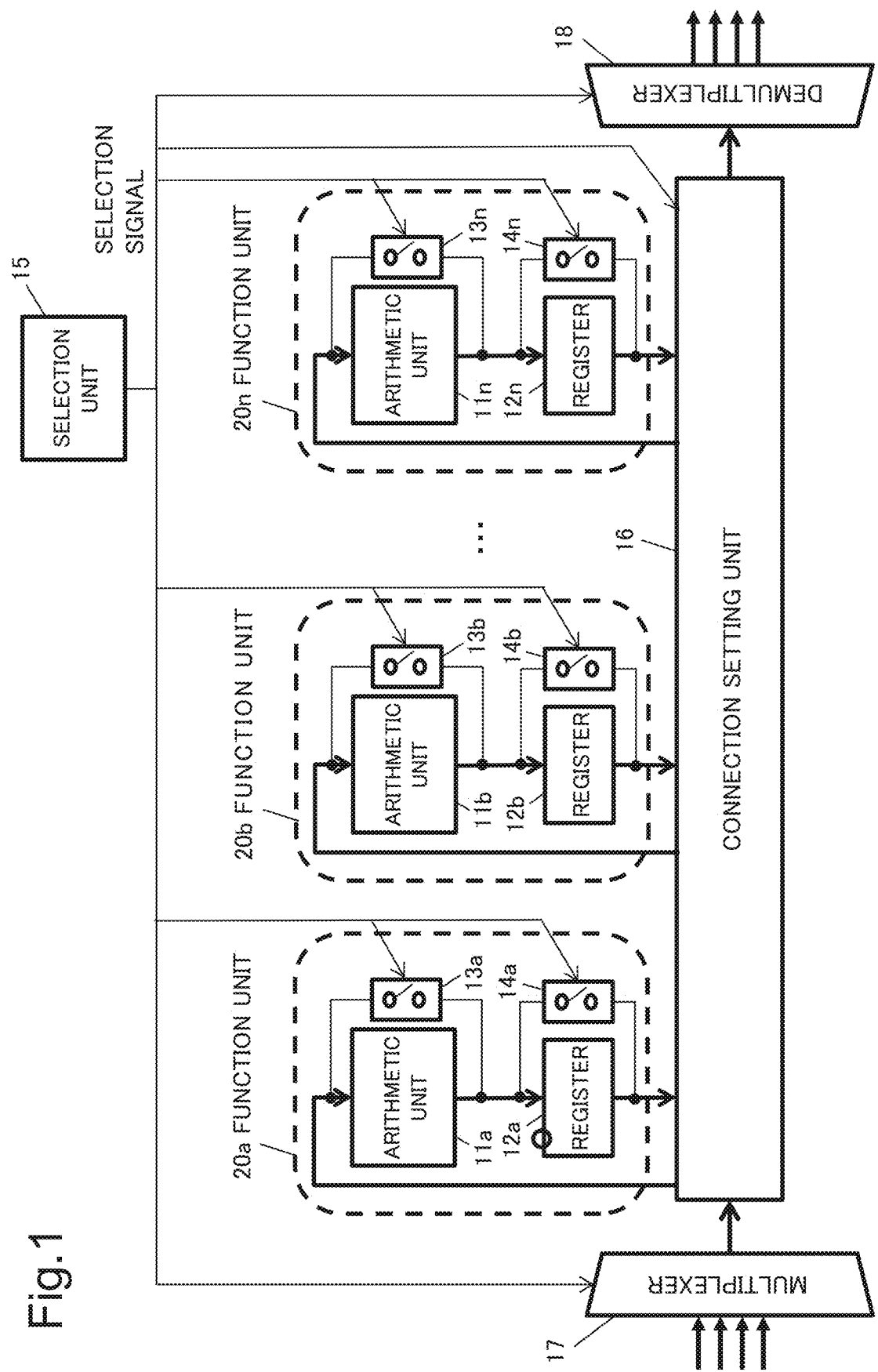
FIG. 1 is a block diagram illustrating a configuration of a processor element according to a first example embodiment.

In the following, a first example embodiment according to the present invention is described. First, a background of the present invention is described.

There are two issues to be solved in a micro-controller unit (MCU) including a computer architecture of a stored program method on the basis of finite automaton. One of the issues is how to eliminate overhead that a finite state machine inherent to an application stored in an external memory element is simulated by a finite state machine within a finite state control unit (specifically, within an arithmetic unit of the MCU). The other is how to utilize a high-level synthesis technique and an operation synthesis technique with respect to definition of an arithmetic unit.

It is necessary to provide measures against these issues, and propose a processor element incorporated with advantages of an MCU, an FPGA, and a DRP being programmable devices. While it is possible to mount the processor element as a design plan, by incorporating the processor element in a development tool, it becomes possible to utilize the method, as a general-purpose designing method for designing a processor element in which a processor is embedded in a sensing device.

In order to achieve the above, it is necessary to define a basic architecture of a processor element, and make it possible to designate a content of the definition in a high-level programming language.

In formulating an architecture of a processor element, it has been aimed at maintaining a programming environment in which an entirety of the architecture can be designed by a function language such as C language. When debugging of a source code is performed, it is necessary that a debugging tool can execute a program along a context extracted from an application program. Specifically, it is necessary that a context of a series of operations written in a function language can be traced.

It is assumed that an architecture of a processor element according to the present example embodiment is configured in such a way that a context of a high-level programming language can be expressed based on semantics and lambda calculation, and two types of contexts can be expressed. One of the contexts is a replaceable static context, which is frequently referred to as information stored in a file, and the other is a dynamic context to be expressed as information stored in a heap register. It is assumed that these contexts can be expressed as function description.

A dynamic context of an application program is expressed by functions as follows.

$$f(A), f(B) \tag{1}$$

In the static context, an argument is mounted as a register, and a function body is mounted as an arithmetic unit including an instruction set generated according to the application program. A function unit being a pair of a register and an arithmetic unit is defined in the static context along a request of the application program. A bypass switch for switching whether to bypass the register and the arithmetic unit is defined. The static context is defined by grouping a required register, arithmetic unit, and bypass switch according to a state.

It is assumed that connection of a group can be described by functions as follows.

$$f(g(\bullet)), f(g(\bullet), h(\bullet)), \tag{2}$$

Next, a configuration according to a first example embodiment is described. FIG. 1 is a block diagram illustrating a configuration of a processor element according to the present example embodiment.

An instruction set is generated based on a request of an application program, and n arithmetic units 11*a*, 11*b*, and 11*n* (where n is an integer of 1 or larger) are mounted. Specifically, arithmetic units 11*a*, 11*b*, and 11*n* perform arithmetic processing on the basis of a function in which an instruction set generated according to an application program is mounted.

Registers 12*a*, 12*b*, and 12*n* are provided in processor element 1 in association with arguments of instruction sets to be mounted in associated arithmetic units 11*a*, 11*b*, and 11*n*.

Specifically, registers 12*a*, 12*b*, and 12*n* respectively store arguments to be used in functions of arithmetic units 11*a*, 11*b*, and 11*n*.

In the following, pairs of arithmetic units 11*a*, 11*b*, 11*c*, and registers 12*a*, 12*b*, 12*n* associated with the arithmetic units are referred to as function units 20*a*, 20*b*, 20*n*.

In the following description, when it is not necessary to describe by designating a specific arithmetic unit, an arithmetic unit is referred to as arithmetic unit 11. Likewise, when it is not necessary to describe by designating a specific register, a register is referred to as register 12, and when it is not necessary to describe by designating a specific function unit, a function unit is referred to as function unit 20.

In processor element 1 according to the present example embodiment, a static context of an application is expressed as a context in which selected function units 20 are connected. The static context is defined by grouping required register 12 and arithmetic unit 11 according to a state. Processor element 1 includes selection unit 15 for selecting required function unit 20 from among function units 20*a*, 20*b*, 20*n* according to each static context in order to associate each static context with each state within processor element 1. Selection unit 15 also designates a connection sequence of the selected function unit. Selection unit 15 is achieved by a finite state machine (FSM) generated according to an application by high-level synthesis, for example.

Processor element 1 includes connection setting unit 16 for setting connection of function unit 20, based on an instruction of selection unit 15. Processor element 1 includes bypass switches 13*a*, 13*b*, and 13*n* for respectively switching whether to bypass arithmetic units 11*a*, 11*b*, and 11*n*, based on an instruction of selection unit 15, and bypass switches 14*a*, 14*b*, and 14*n* for respectively switching and selecting whether to bypass registers 12*a*, 12*b*, and 12*n*, based on an instruction of selection unit 15. In the following description, when it is not necessary to describe by designating a specific bypass switch among bypass switches for respectively switching whether to bypass arithmetic units 11*a*, 11*b*, and 11*n*, bypass switches 13*a*, 13*b*, and 13*n* are referred to as bypass switches 13. Likewise, when it is not necessary to describe by designating a specific bypass switch among bypass switches for respectively switching whether to bypass registers 12a, 12b, and 12n, bypass switches 14a, 14b, and 14n are referred to as bypass switches 14.

Processor element 1 includes multiplexer 17 for switching an input to connection setting unit 16, and demultiplexer 18 for switching an output destination of an output from connection setting unit 16.

Selection unit 15 outputs, to bypass switch 13, bypass switch 14, connection setting unit 16, multiplexer 17, and demultiplexer 18, a selection signal for instructing switching according to a state within processor element 1. Thus, selection of a function unit associated with each state and selection of a processing sequence of the function unit are performed, and selection unit 15 performs selection of a function associated with each state by bypassing a function unit that is not required, and switching a connection sequence of function unit 20. Selection unit 15 switches an input to a function unit associated with each state, and an output destination.

The selection signal includes a static context selection signal being a selection signal for a static context, and a dynamic context selection signal being a selection signal for a dynamic context.

In this way, in the present example embodiment, selection unit 15 being a finite state machine (FSM) associates a static context with each state within processor element 1, and switches setting of bypass switch 13, bypass switch 14, and connection setting unit 16 within function unit 20, as the state proceeds.

Processor element 1 is connected to four processor elements 1 respectively adjacent to four sides of processor element 1. Signals output from four adjacent processor elements 1 are input to multiplexer 17. Multiplexer 17 selects one of inputs from a plurality of adjacent processor elements 1 according to a selection signal to be output from selection unit 15, and inputs an output of selected processor element 1 to connection setting unit 16.

Connection setting unit 16 outputs, to an arithmetic unit of a function unit which performs first processing, a signal from multiplexer 17, based on a selection signal from selection unit 15. The output of the arithmetic unit is output to a register of the same function unit. When bypassing the arithmetic unit by a bypass switch is instructed by a selection signal from selection unit 15, a signal input to the arithmetic unit bypasses the arithmetic unit and is output to the register.

The output of register 12 is output to connection setting unit 16. When bypassing the register by a bypass switch is instructed by a selection signal from selection unit 15, a signal input to the register bypasses the register and is output to connection setting unit 16.

Connection setting unit 16 outputs, to an arithmetic unit of a function unit which performs next processing, an output of a function unit which performs first processing, based on an instruction of selection unit 15. When the output is an output from register 12 of a function unit which performs last processing, connection setting unit 16 outputs, to demultiplexer 18, a signal from register 12, based on an instruction of selection unit 15.

Demultiplexer 18 outputs an output from a connection setting unit being an output from a function unit which performs last processing by selecting one of a plurality of adjacent processor elements 1 according to a selection signal to be output from selection unit 15.

This operation is similar to context switching in a DRP. Specifically, this is equivalent to generating an optimum DRP according to an application each time in a processor element according to the present example embodiment.

In the above-described MCU including a computer architecture of a stored program method on the basis of finite automaton, an FSM inherent to an application is mounted on a memory element, which is mounted on an outside of a processor element. In this point, the present example embodiment is different from the above-described MCU. In the above-described MCU, since an FSM according to an application is simulated by reading and writing with respect to a memory by an addressing function of an external memory element, overhead is additionally required by an amount corresponding to the simulation. In processor element 1 according to the present example embodiment, since an FSM according to an application directly operates on a hardware of processor element 1, electric power consumption is improved, as compared with the above-described MCU.

Figure 11:
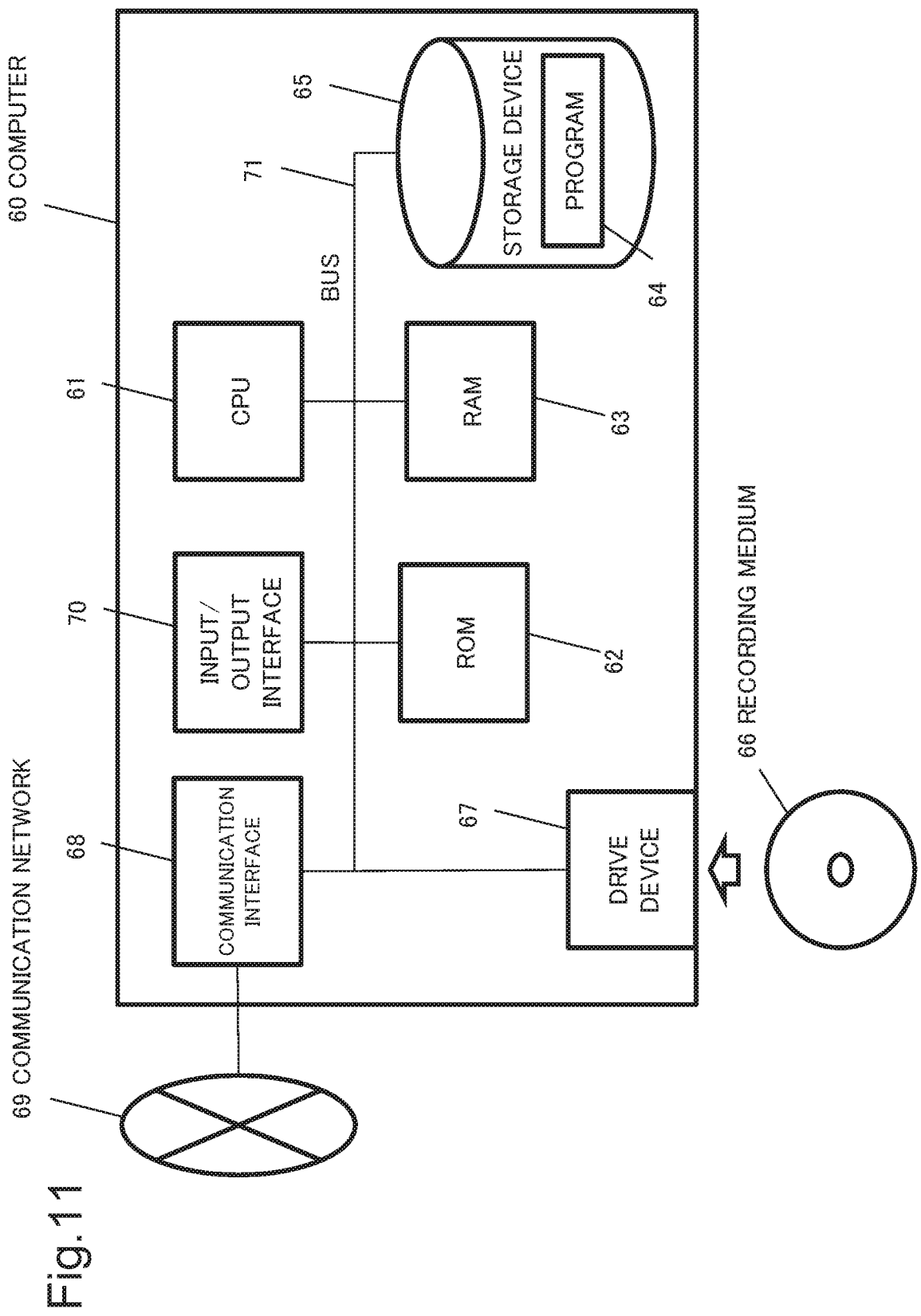
FIG. 11 is a diagram illustrating one example of a configuration of a computer for achieving each unit of each of the example embodiments.

Each constituent element of a moving target search system according to the first example embodiment illustrated in FIG. 1 and the other example embodiments to be described later indicates a block of a functional unit. A part or all of each constituent element of a moving target search system according to each example embodiment may be achieved by any combination of computer 60 as illustrated in FIG. 11, and a program, for example. Computer 60 includes, as one example, the following components.

Central processing unit (CPU) 61
Read only memory (ROM) 62
Random access memory (RAM) 63
Program 64 to be loaded in RAM 63
Storage device 65 for storing program 64
Drive device 67 for reading and writing with respect to recording medium 66
Communication interface 68 to be connected to communication network 69
Input/output interface 70 for performing input and output of data
Bus 71 for connecting each constituent element Each constituent element of each example embodiment is achieved by causing CPU 61 to acquire and execute program 64 for achieving these functions. For example, in the example of processor element 1 in FIG. 1, arithmetic unit 11 may achieve a function by causing CPU 61 that has acquired program 64 to execute arithmetic processing on the basis of a function, based on program 64. Register 12 may achieve a function by causing CPU 61 that has acquired program 64 to execute storing processing of storing an argument of the above-described function on storage device 65. Bypass switches 13 and 14 may achieve a function by causing CPU 61 that has acquired program 64 to bypass the above-described arithmetic processing and the above-described storing processing, based on program 64. Connection setting unit 16 may achieve a function by causing CPU 61 that has acquired program 64 to switch a sequence of arithmetic processing and storing processing for achieving a function, based on program 64. Selection unit 15 may achieve a function by causing CPU 61 that has acquired program 64 to perform switching whether to bypass the above-described arithmetic processing, switching whether to bypass the above-described storing processing, and switching a sequence of arithmetic processing and storing processing, based on program 64. Multiplexer 17 may achieve a function by causing CPU 61 that has acquired program 64 to select and input an output of either of the adjacent processor elements, based on program 64. Demultiplexer 18 may achieve a function by causing CPU 61 that has acquired program 64 to select, as an output destination, either of the adjacent processor elements, based on program 64.

Program 64 for achieving a function of each constituent element of each example embodiment may be stored in advance, for example, in storage device 65, ROM 62, or RAM 63, and configured in such a way that CPU 61 reads program 64 as necessary.

Program 64 may be supplied to CPU 61 via communication network 69, or may be stored in advance in recording medium 66, and supplied to CPU 61 by causing driver device 67 to read the program.

Figure 12:
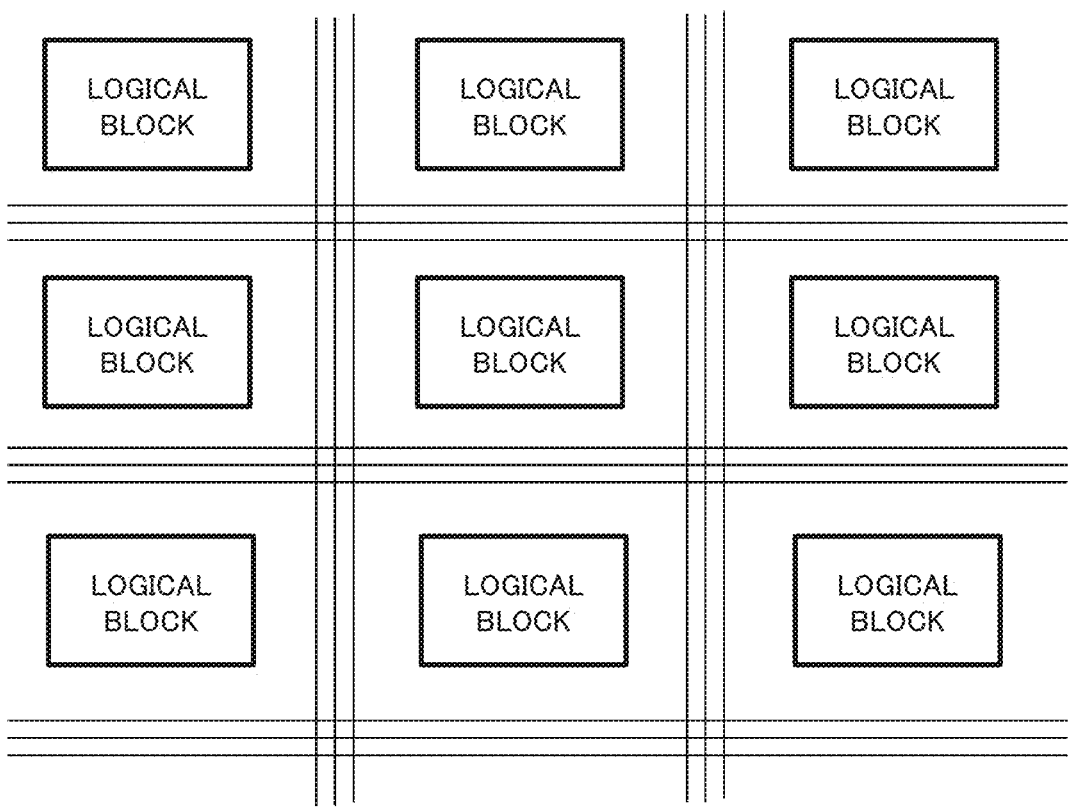
FIG. 12 is a diagram illustrating an example of a wiring layout within a programmable device.

Next, a layout of a processor element and wiring among processor elements on a programmable device according to the present example embodiment are described. As illustrated in FIG. 12, in the above-described general MCU, FPGA, and DRP, there are constraints such that logical blocks are regularly disposed and wired on the above-described MCU and FPGA by a mesh data path. Such a layout and wiring become constraints, when a high-level synthesizing tool performs a universal layout and wiring.

Figure 13:
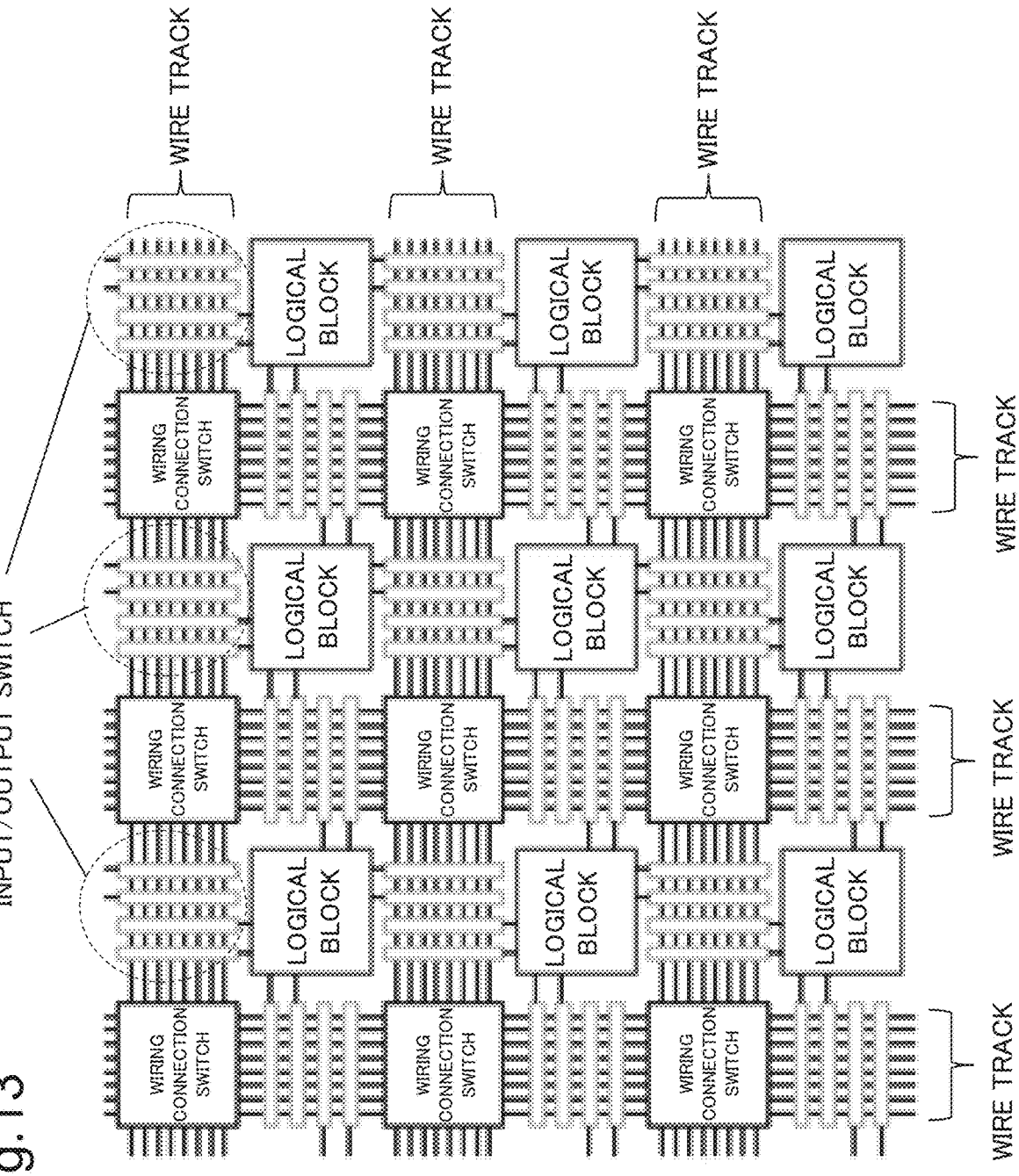
FIG. 13 is a diagram illustrating details of FIG. 12.

FIG. 13 is a diagram illustrating details of FIG. 12. As illustrated in FIG. 13, the above-described MCU and FPGA are configured of a logical block, a wiring connection switch, an input-output switch, and a wire track. The logical block is configured of a look-up table (LUT) being a variable logic, and a flip-flop being a sequence circuit, the wiring connection switch switches vertical and horizontal wiring connections, the input-output switch is used for connection between a logical block and wiring, and the wire track is used for wiring between wiring connection switches.

On the other hand, in the present example embodiment, it is assumed that a data path as illustrated in FIG. 12 is not fixedly disposed among processor elements, and connection among processor elements is among adjacent processor elements. On a programmable device according to the present example embodiment, a logical block expressed as a function is universally connectable. Processor element 1 according to the present example embodiment avoids constraints with respect to a high-level synthesizing tool by also enabling to define a function merely of a bypass. In processor element 1 according to the present example embodiment, a general-purpose arithmetic unit is not prepared in advance. By determining with use of a high-level synthesizing tool in mounting, in processor element 1 according to the present example embodiment in which a bit width of an arithmetic unit is also arbitrarily settable, the above configuration enables enhancing mounting efficiency.

Figure 2:
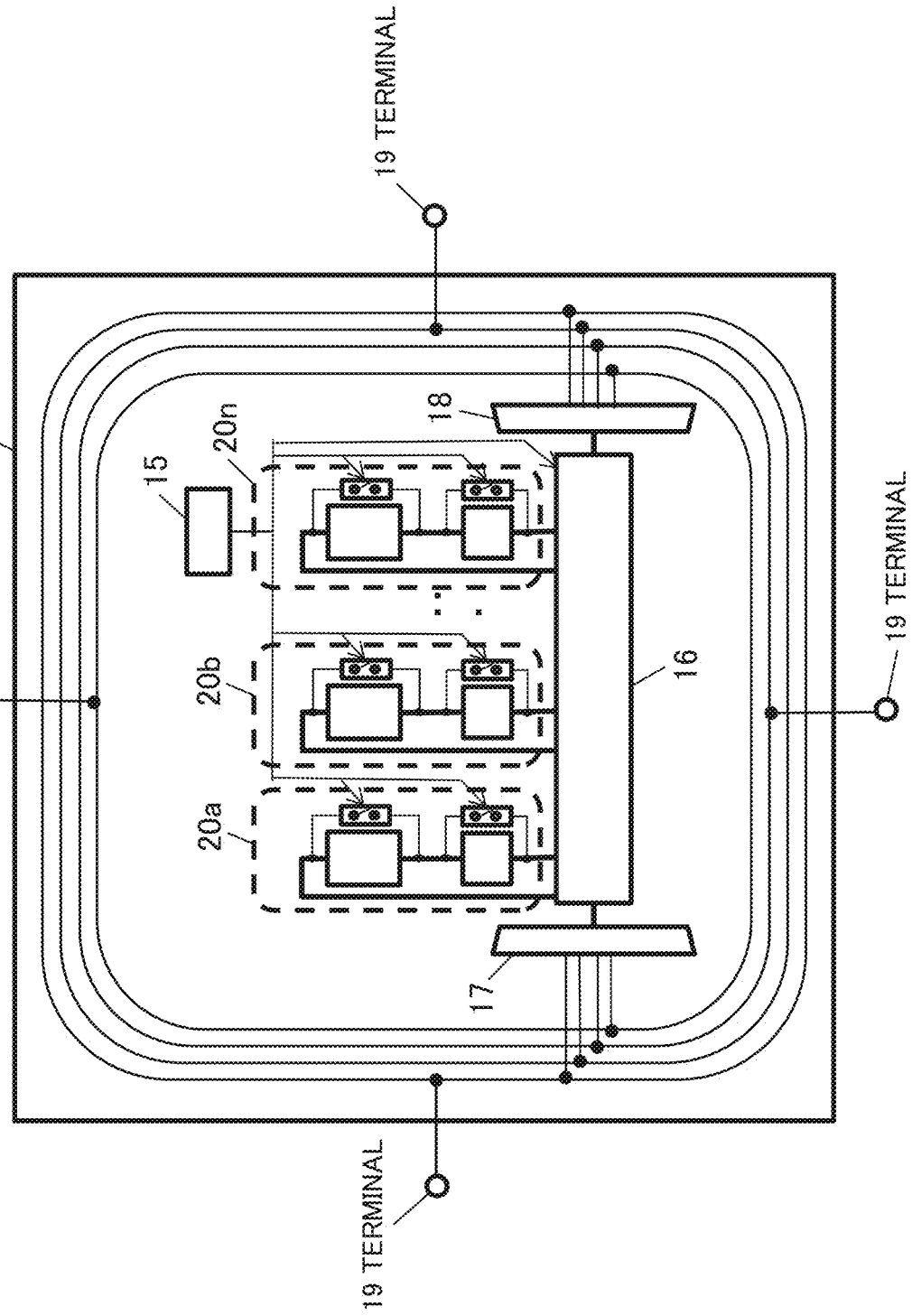
FIG. 2 is a block diagram illustrating one example of a configuration of a connecting portion to an adjacent processor in the processor element according to the first example embodiment.

FIG. 2 is a block diagram illustrating one example of a configuration of a connecting portion to an adjacent processor in a processor element according to the present example embodiment. As illustrated in FIG. 2, processor element 1 includes four terminals 19 for connecting to four adjacent processor elements 1. Each of four terminals 19 is connected to either of input terminals of multiplexer 17, and is connected to either of output terminals of demultiplexer 18. Signals output from four adjacent processor elements 1 are input to multiplexer 17 via four terminals 19. A signal output from demultiplexer 18 is output to associated processor element 1 via either of four terminals 19.

Figure 3:
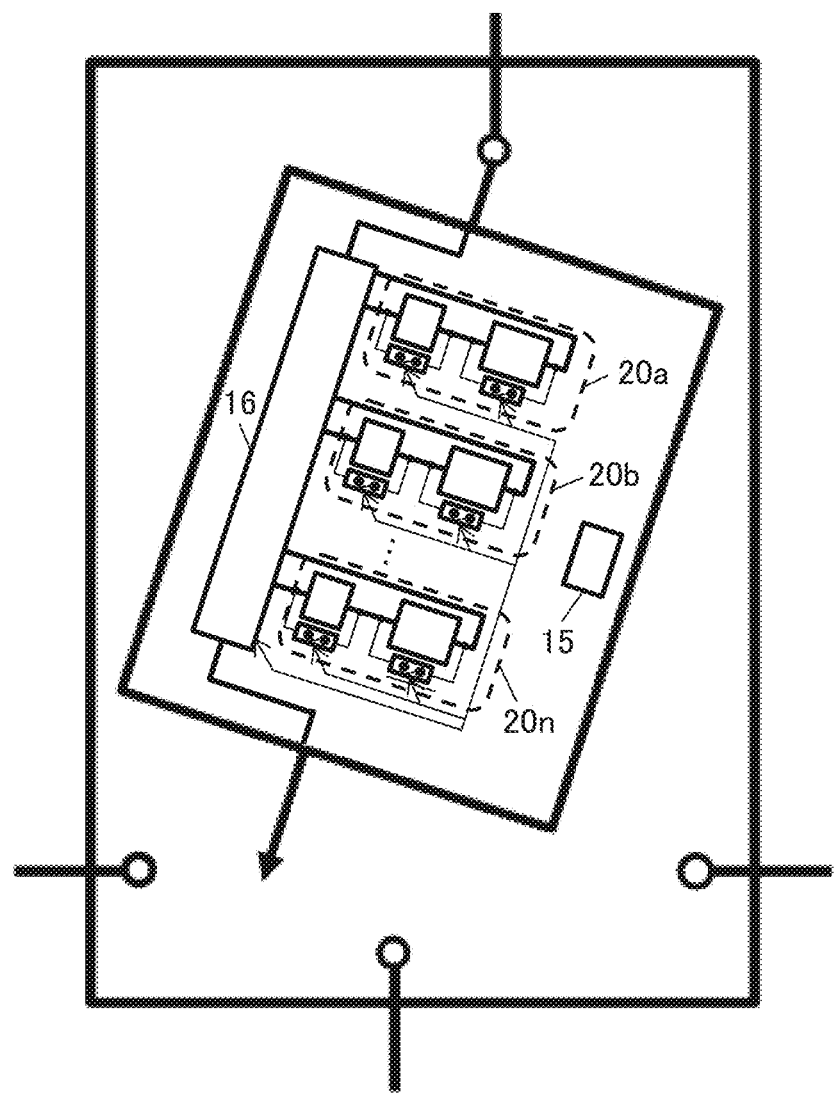
FIG. 3 is a diagram illustrating an overview of a connection switching function of the processor element according to the first example embodiment.

FIG. 3 is a diagram illustrating an overview of a connection switching function of a processor element according to the present example embodiment. As illustrated in FIG. 3, processor element 1 according to the present embodiment is able to select which one of processor elements other than an adjacent processor element selected as an input is an output of processor element 1 by switching an output of demultiplexer 18. Although not illustrated in FIG. 3, processor element 1 according to the present example embodiment is able to select which one of outputs of adjacent processor elements is an input of processor element 1 by switching multiplexer 17 in FIG. 1. Processor element 1 according to the present example embodiment is able to select whether to bypass arithmetic units 11*a*, 11*b*, and 11*n*, and registers 12*a*, 12*b*, and 12*n* by switching bypass switches 13*a*, 13*b*, and 13*n*, and 14*a*, 14*b*, and 14*n* within processor element 1.

These configurations do not necessitate a layout wiring switch (switch block), an input-output switch (connection block), and a wire track, which are used in a general FPGA and the like, and enable covering the entire surface of a chip of a programmable device with an arithmetic resource.

Figure 4:
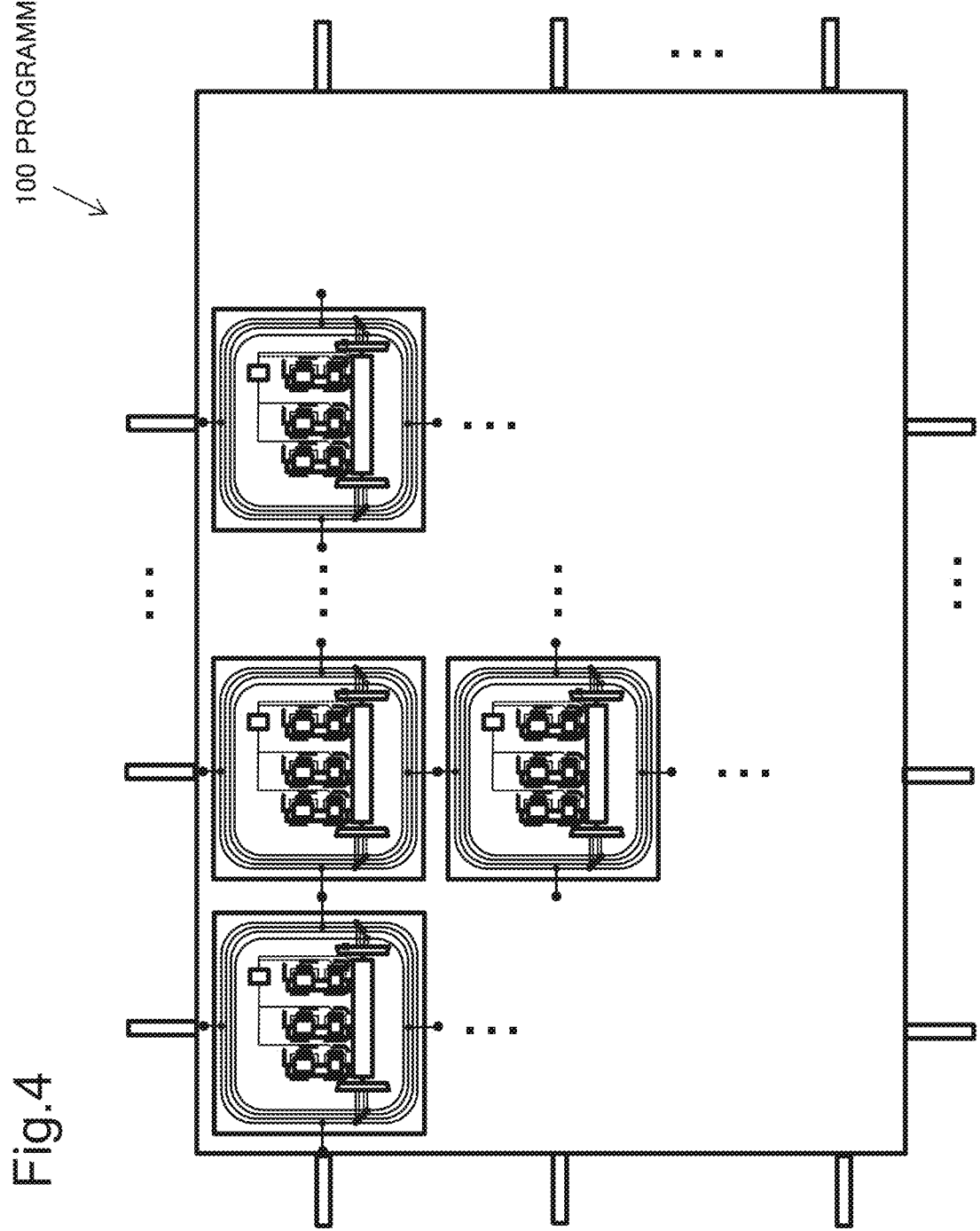
FIG. 4 is a diagram illustrating an example of a configuration of a programmable device configured by connecting the processor elements according to the first example embodiment.
Figure 5:
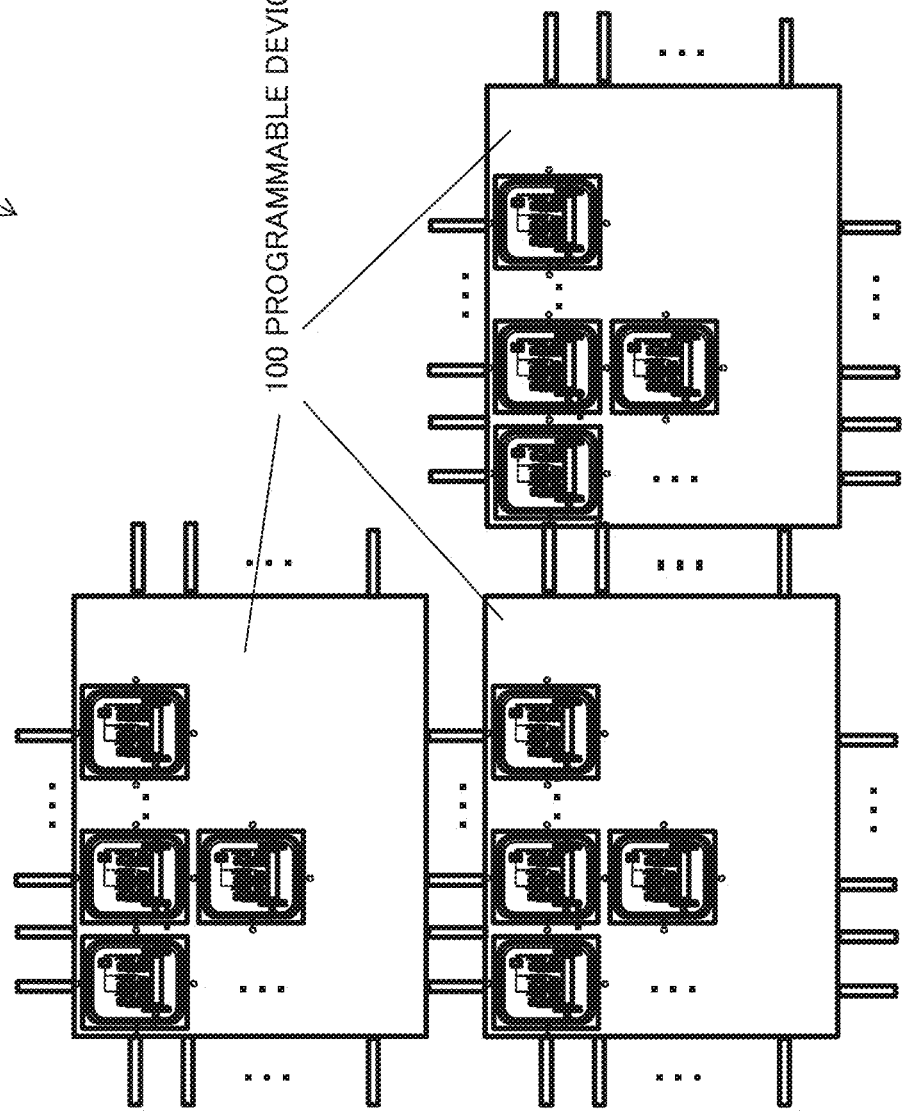
FIG. 5 is a diagram illustrating an example of a configuration of a programmable device configured by connecting the programmable devices in FIG. 4.

FIG. 4 is a diagram illustrating an example of a configuration of a programmable device configured by connecting a processor elements. As illustrated in FIG. 4, in programmable device 100, a plurality of processor elements are disposed adjacent to one another. On programmable device 100, processor elements that are not adjacent to one another are not directly connected, and processor elements adjacent to one another are connected to one another. Also in such a layout, as described above, as illustrated in FIG. 3, processor element 1 according to the present example embodiment is able to select which one of processor elements other than an adjacent processor element selected as an input is an output of processor element 1 by switching an output of demultiplexer 18. By switching bypass switches 13*a*, 13*b*, and 13*n*, and 14*a*, 14*b*, and 14*n* within processor element 1, processor element 1 is able to select whether to bypass arithmetic units 11*a*, 11*b*, and 11*n*, and registers 12*a*, 12*b*, and 12*n*. By such a configuration, it is possible to configure programmable device 100 by universally connecting a plurality of logical blocks configured of function unit 20, selection unit 15, and connection setting unit 16 of processor element 1 to a logical block away from the logical blocks on a processor element. FIG. 5 is a diagram illustrating an example of a configuration of programmable device 110 configured by connecting programmable devices 100 in FIG. 4. As illustrated in FIG. 5, connection among programmable devices 100 in FIG. 4 may be only among adjacent programmable devices.

Figure 6:
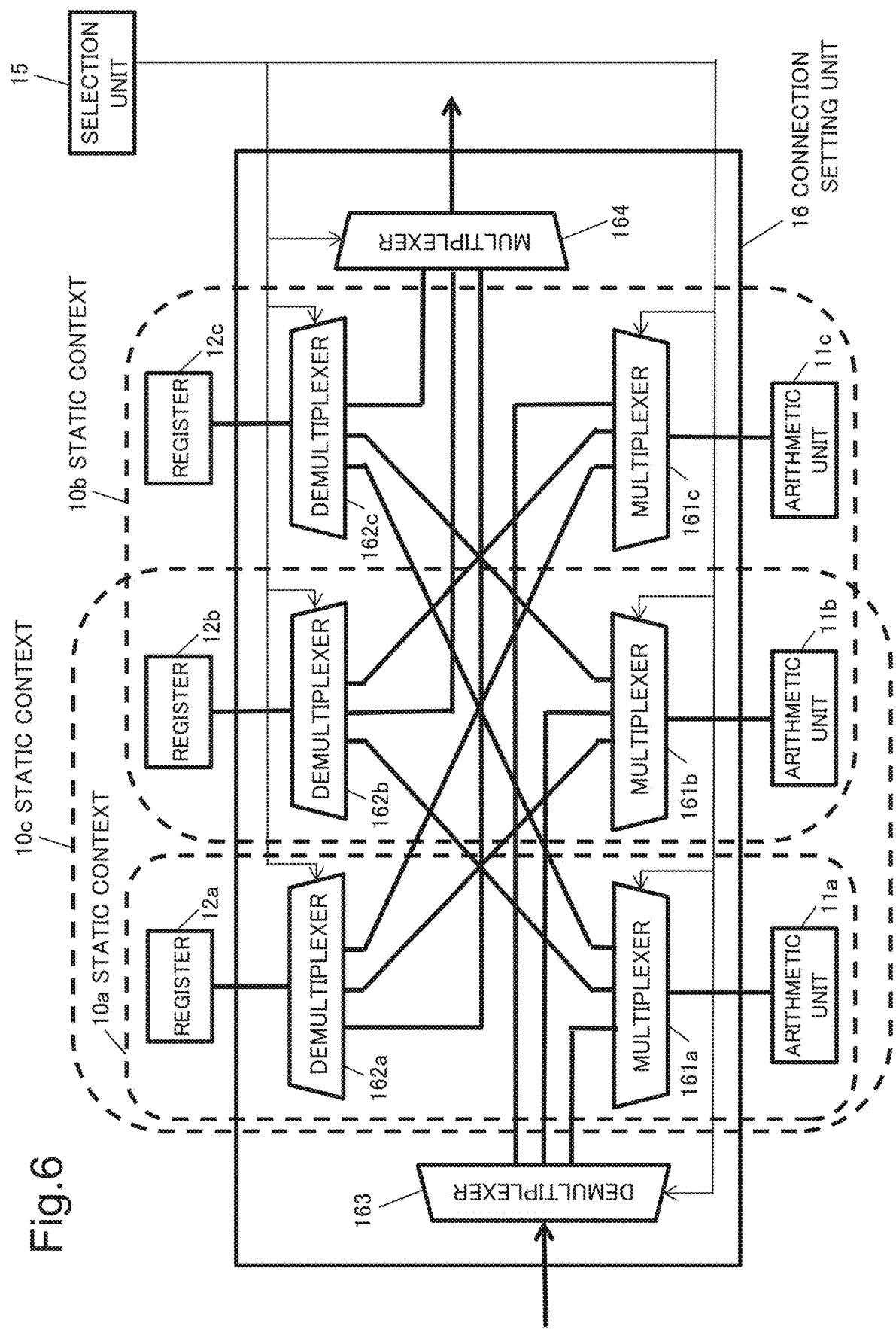
FIG. 6 is a block diagram illustrating one example of a configuration of a connection setting unit according to the first example embodiment.

FIG. 6 is a block diagram illustrating one example of a configuration of a connection setting unit according to the present example embodiment. As illustrated in FIG. 6, connection setting unit 16 includes multiplexers 161*a*, 161*b*, and 161*c* for selecting a signal to be input to arithmetic units 11*a*, 11*b*, and 11*c*, and demultiplexers 162*a*, 162*b*, and 162*c* for selecting an output destination of a signal from registers 12*a*, 12*b*, and 12*c*. Connection setting unit 16 includes demultiplexer 163 for selecting a signal input to connection setting unit 16, and multiplexer 164 for selecting an output destination of a signal to be output from connection setting unit 16. A selection signal to be output from selection unit 15 is input to these elements.

Multiplexers 161*a*, 161*b*, and 161*c* connected to arithmetic units 11*a*, 11*b*, and 11*c* are connected to an output of demultiplexer 163. Demultiplexer 163 selects either of multiplexers 161*a*, 161*b*, and 161*c*, based on a selection signal from selection unit 15, and outputs a signal input to connection setting unit 16.

A demultiplexer to be connected to a register of a function unit other than a function unit of a connected arithmetic unit, and demultiplexer 163 are connected to an input to multiplexers 161*a*, 161*b*, and 161*c*. Multiplexers 161*a*, 161*b*, and 161*c* select, from among signals from the demultiplexer to be connected to the register of the other function unit, and demultiplexer 163, a signal to be input to the connected arithmetic unit, based on a selection signal from selection unit 15.

A multiplexer connected to an arithmetic unit of a function unit other than a function unit of a connected register, and multiplexer 164 are connected to an output from demultiplexers 162a, 162b, and 162c. Demultiplexers 162a, 162b, and 162c select either of the multiplexer connected to the arithmetic unit of the other function unit, and multiplexer 164, based on a selection signal from selection unit 15, and outputs a signal from the connected register.

Demultiplexers 162a, 162b, and 162c connected to registers 12a, 12b, and 12c are connected to an input of multiplexer 164. Multiplexer 164 selects a signal input from either of demultiplexers 162a, 162b, and 162c, based on a selection signal from selection unit 15, and outputs the selected signal from connection setting unit 16.

For example, when static context 10a illustrated in FIG. 6 is achieved, demultiplexer 163 selects multiplexer 161a as an output destination of a signal input to connection setting unit 16, based on a selection signal from selection unit 15, and multiplexer 161a selects a signal from demultiplexer 163, based on a selection signal from selection unit 15. Demultiplexer 162a selects multiplexer 164 as an output destination of a signal from connected register 12a, based on a selection signal from selection unit 15, and multiplexer 164 selects a signal from demultiplexer 162a, based on a selection signal from selection unit 15, and outputs the selected signal from connection setting unit 16.

For example, when static context 10b illustrated in FIG. 6 is achieved, demultiplexer 163 selects multiplexer 161b as an output destination of a signal input to connection setting unit 16, based on a selection signal from selection unit 15, and multiplexer 161b selects a signal from demultiplexer 163, based on a selection signal from selection unit 15. Demultiplexer 162b selects multiplexer 161c as an output destination of a signal from connected register 12b, based on a selection signal from selection unit 15, and multiplexer 161c selects a signal from demultiplexer 162b as a signal to be input to arithmetic unit 11c to be connected, based on a selection signal from selection unit 15. Demultiplexer 162c selects multiplexer 164 as an output destination of a signal from connected register 12c, based on a selection signal from selection unit 15, and multiplexer 164 selects a signal from demultiplexer 162c, based on a selection signal from selection unit 15, and outputs the selected signal from connection setting unit 16.

For example, when static context 10c illustrated in FIG. 6 is achieved, demultiplexer 163 selects multiplexer 161a as an output destination of a signal input to connection setting unit 16, based on a selection signal from selection unit 15. Multiplexer 161a selects a signal from demultiplexer 163 as a signal to be input to arithmetic unit 11a to be connected, based on a selection signal from selection unit 15. Demultiplexer 162a selects multiplexer 161b as an output destination of a signal from connected register 12a, based on a selection signal from selection unit 15. Multiplexer 161b selects a signal from demultiplexer 162a as a signal to be input to arithmetic unit 11b to be connected, based on a selection signal from selection unit 15. Demultiplexer 162b selects multiplexer 164 as an output destination of a signal from connected register 12b, based on a selection signal from selection unit 15. Multiplexer 164 selects a signal from demultiplexer 162b, based on a selection signal from selection unit 15, and outputs the selected signal from connection setting unit 16.

In this way, according to the present example embodiment, it becomes possible to output a signal input to connection setting unit 16 to an arithmetic unit of at least one function unit, based on a selection signal from selection unit 15, connect a required function unit in any sequence, and output, from connection setting unit 16, an output from a register of a last function unit. Arithmetic units 11a, 11b, and 11c are sharable among static contexts.

As described above, a configuration according to the present example embodiment enables improving a degree of integration with less constraints on a layout and wiring of a logical block in a programmable device.

Figure 7:
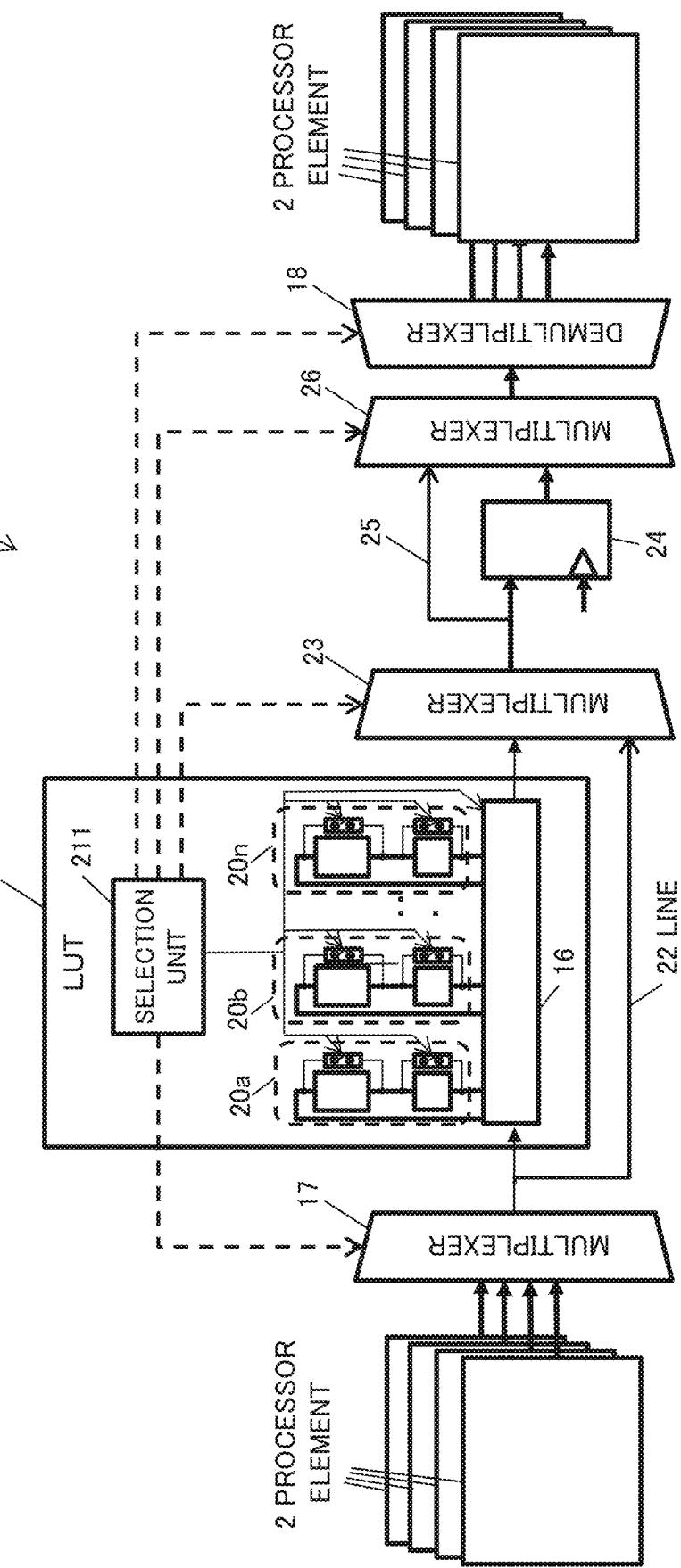
FIG. 7 is a diagram illustrating a configuration of a processor element according to a second example embodiment.

Next, a second example embodiment is described. The present example embodiment is an example embodiment, when the present invention is applied to an FPGA. FIG. 7 is a block diagram illustrating a configuration of a processor element according to the second example embodiment. As illustrated in FIG. 7, processor element 2 according to the present example embodiment includes look-up table (LUT) 21. Arithmetic unit 11, register 12, bypass switches 13 and 14, and connection setting unit 16 similarly to those in the first example embodiment are mounted in LUT 21. Processor element 2 includes multiplexer 17 and demultiplexer 18 to be connected to adjacent processor element 2, similarly to the first example embodiment.

Processor element 2 according to the present example embodiment includes line 22 for bypassing LUT 21, and multiplexer 23 for selecting line 22 and an output of LUT 21. Processor element 2 includes flip-flop 24 to which a clock and an output of multiplexer 23 are input, and line 25 for bypassing flip-flop 24, and includes multiplexer 26 for selecting line 25 and an output of flip-flop 24. LUT 21 includes selection unit 211 for performing selection of multiplexers 17, 23, and 26, demultiplexer 18, arithmetic units of function units 20a, 20b, 20n and bypass switches of registers, and connection setting unit 16.

A configuration according to the present example embodiment provides an advantageous effect similar to that in the first example embodiment in a processor element being an FPGA.

Figure 8:
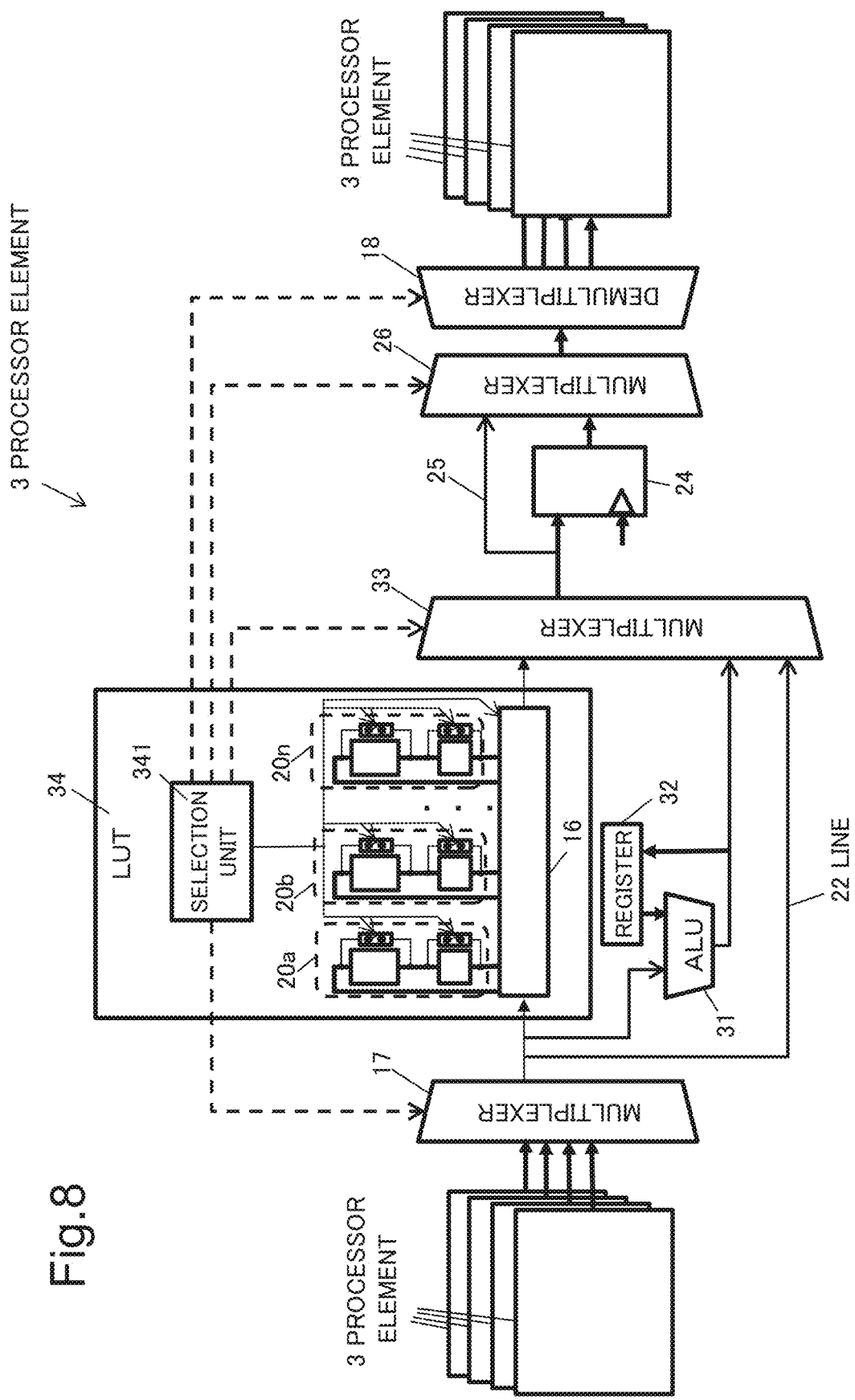
FIG. 8 is a diagram illustrating a configuration of a processor element according to a third example embodiment.

Next, a third example embodiment is described. FIG. 8 is a diagram illustrating a configuration of a processor element according to the third example embodiment. As illustrated in FIG. 8, processor element 3 according to the present example embodiment further includes ALU 31 to be generated by high-level synthesis, and register 32, in addition to a configuration according to the second example embodiment. ALU 31 is configured in such a way that an output of multiplexer 17 is branched and input, and an output of ALU 31 is connected to multiplexer 33. An output of LUT 34, line 22 for bypassing LUT 34, and an output of ALU 31 are connected to multiplexer 33. Multiplexer 33 selects either of these outputs, based on an instruction from selection unit 341 of LUT 34, and outputs the selected output to flip-flop 24 and multiplexer 26.

A configuration according to the present example embodiment provides an advantageous effect similar to that in the first example embodiment in a processor element in which an FPGA and an ALU are mounted in combination.

Figure 9:
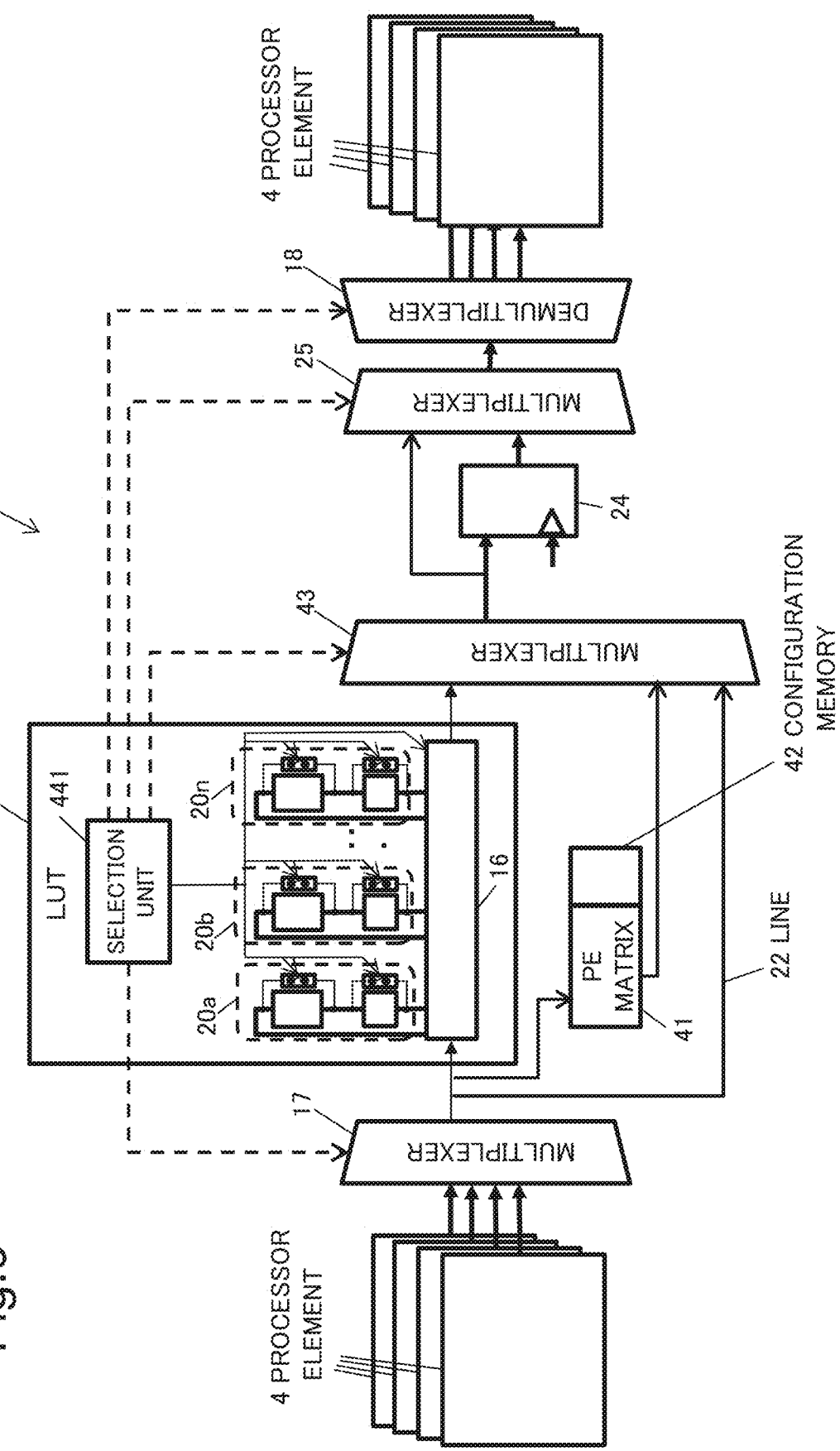
FIG. 9 is a diagram illustrating a configuration of a processor element according to a fourth example embodiment.

Next, a fourth example embodiment is described. FIG. 9 is a diagram illustrating a configuration of a processor element according to the fourth example embodiment. As illustrated in FIG. 9, processor element 4 according to the present example embodiment further includes PE matrix 41 of a DRP and configuration memory 42, in addition to a configuration according to the second example embodiment. PE matrix 41 is configured in such a way that an output of multiplexer 17 is branched and input, and an output of PE matrix 41 is connected to multiplexer 43. An output of LUT 44, line 22 for bypassing LUT 44, and an output of PE matrix 41 are connected to multiplexer 43. Multiplexer 43 selects either of these outputs, based on an instruction from selection unit 441 of LUT 44, and outputs the selected output to flip-flop 24 and multiplexer 26.

A configuration according to the present example embodiment provides an advantageous effect similar to that in the first example embodiment in a processor element in which an FPGA and a DRP are mounted in combination.

Figure 10:
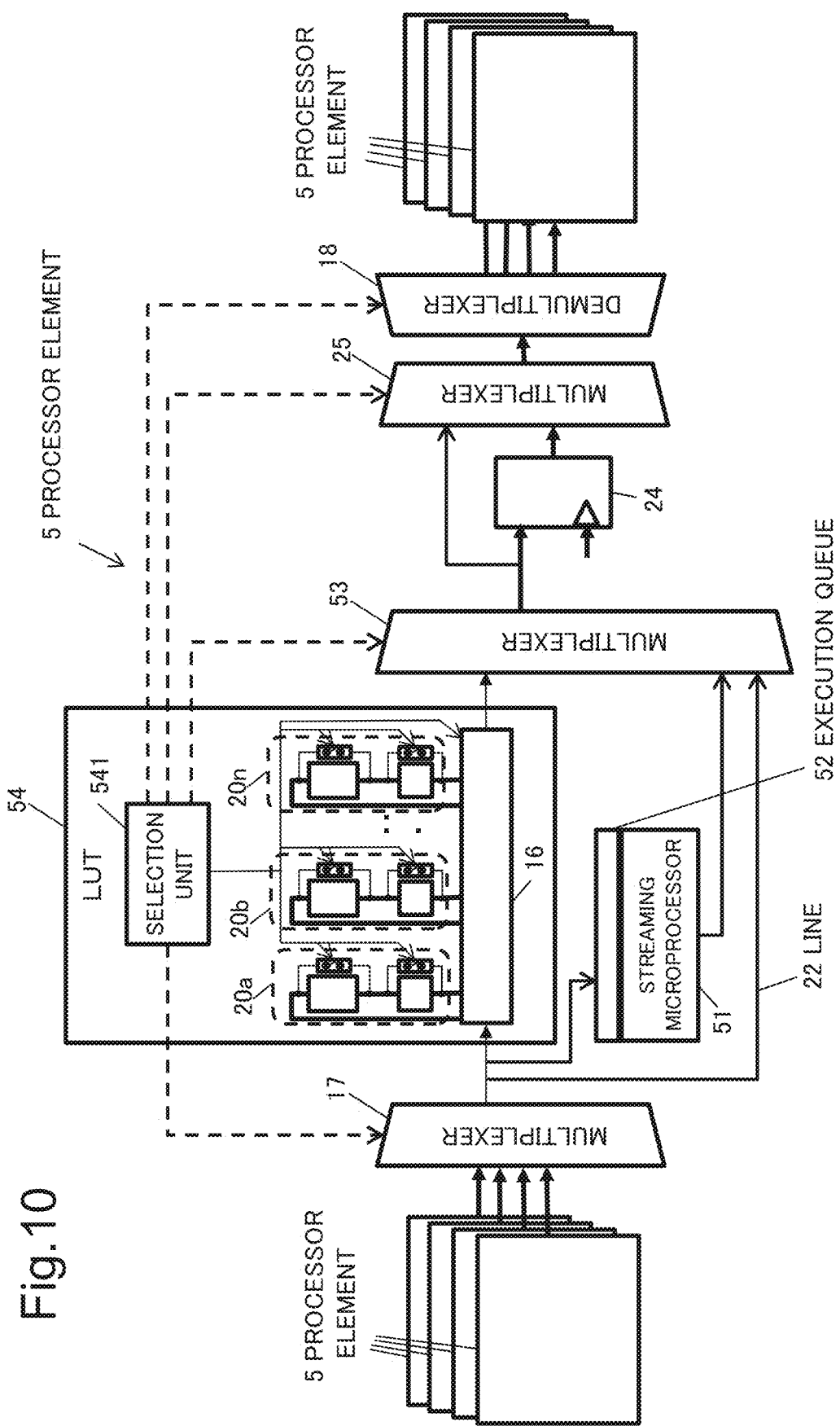
FIG. 10 is a diagram illustrating a configuration of a processor element according to a fifth example embodiment.

Next, a fifth example embodiment is described. FIG. 10 is a diagram illustrating a configuration of a processor element according to the fifth example embodiment. As illustrated in FIG. 10, processor element 5 according to the present example embodiment further includes streaming microprocessor 51 of a GPGPU and execution queue 52, in addition to a configuration according to the second example embodiment. Streaming microprocessor 51 is configured in such a way that an output of multiplexer 17 is branched and input, and an output of streaming microprocessor 51 is connected to multiplexer 53. An output of LUT 54, line 22 for bypassing LUT 54, and an output of streaming microprocessor 51 are connected to multiplexer 53. Multiplexer 53 selects either of these outputs, based on an instruction from selection unit 541 of LUT 54, and outputs the selected output to flip-flop 24 and multiplexer 26.

A configuration according to the present example embodiment provides an advantageous effect similar to that in the first example embodiment in a processor element in which an FPGA and a GPGPU are mounted in combination.

In the foregoing, the present invention has been described with reference to example embodiments. The present invention, however, is not limited to the above-described example embodiments. A configuration and details of the present invention can be modified in various ways comprehensible to a person skilled in the art within the scope of the present invention.

REFERENCE SIGNS LIST 1, 2, 3, 4, 5 Processor element
11, 11a, 11b, 11c, 11n Arithmetic unit
12, 12a, 12b, 12c, 12n Register
13, 13a, 13b, 13n Bypass switch
14, 14a, 14b, 14n Bypass switch
15 Selection unit
16 Connection setting unit
161a, 161b, 161c, 164 Multiplexer
162a, 162b, 162c, 163 Demultiplexer
17 Multiplexer
18 Demultiplexer
19 Terminal
20, 20a, 20b, 20n Function unit
21, 34, 44, 54 LUT
211, 341, 441, 541 Selection unit
22, 25 Line
24 Flip-flop
23, 26, 33, 43, 53 Multiplexer
31 ALU
32 Register
41 PE matrix
42 Configuration memory
51 Streaming microprocessor
52 Execution queue
60 Computer
61 CPU
62 ROM
63 RAM
64 Program
65 Storage device
66 Recording medium
67 Drive device
68 Communication interface
69 Communication network
70 Input/output interface
71 Bus
100, 110 Programmable device

The invention claimed is:

1. A processor element comprising:
an arithmetic unit that performs arithmetic processing based on a function in which an instruction set generated according to a program is mounted;
a register that stores an argument of the function;
a first bypass switch that switches whether to bypass the arithmetic unit;
a second bypass switch that switches whether to bypass the register;
a connection setting unit that switches connection of a function unit being a pair of the register and the arithmetic unit;
a multiplexer that switches an input to the connection setting unit;
a demultiplexer that switches an output destination of an output from the connection setting unit; and
a selection unit that performs, according to a state, switching of the first bypass switch, the second bypass switch, the connection setting unit, a multiplexer, and a demultiplexer.

2. The processor element according to claim 1, wherein the selection unit is a finite state machine to be generated according to an application by high-level synthesis.

3. The processor element according to claim 1, wherein the connection setting unit includes
a multiplexer that selects a signal to be input to the arithmetic unit, based on a selection signal to be output from the selection unit,
a demultiplexer that selects an output destination of a signal from the register, based on a selection signal to be output from the selection unit,
a demultiplexer that selects an output destination of a signal input to the connection setting unit, based on a selection signal to be output from the selection unit, and
a multiplexer that selects a signal to be output from the connection setting unit, based on a selection signal to be output from the selection unit.

4. The processor element according to claim 1, wherein the arithmetic unit, the register, the first bypass switch, the second bypass switch, the connection setting unit, and the selection unit are incorporated in a look-up table.

5. The processor element according to claim 4, further comprising
a line for bypassing the look-up table, and a multiplexer configured to select the line and an output of the look-up table.

6. The processor element according to claim 5, further comprising
an ALU to be generated by high-level synthesis, and a register, wherein
the multiplexer is connected to an output of the look-up table, the line for bypassing the look-up table, and an output of the ALU.

7. A programmable device in which a plurality of the processor elements according to claim 1 are disposed adjacent to one another, wherein
processor elements that are not adjacent to one another are not directly connected, and processor elements adjacent to one another are connected to one another.

8. The processor element according to claim 2, wherein the connection setting unit includes
a multiplexer that selects a signal to be input to the arithmetic unit, based on a selection signal to be output from the selection unit,
a demultiplexer that selects an output destination of a signal from the register, based on a selection signal to be output from the selection unit,
a demultiplexer that selects an output destination of a signal input to the connection setting unit, based on a selection signal to be output from the selection unit, and
a multiplexer that selects a signal to be output from the connection setting unit, based on a selection signal to be output from the selection unit.

9. The processor element according to claim 2, wherein the arithmetic unit, the register, the first bypass switch, the second bypass switch, the connection setting unit, and the selection unit are incorporated in a look-up table.

10. The processor element according to claim 3, wherein the arithmetic unit, the register, the first bypass switch, the second bypass switch, the connection setting unit, and the selection unit are incorporated in a look-up table.

11. The processor element according to claim 8, wherein the arithmetic unit, the register, the first bypass switch, the second bypass switch, the connection setting unit, and the selection unit are incorporated in a look-up table.

12. The processor element according to claim 8, further comprising
a multiplexer including a line for bypassing the look-up table, and configured to select the line and an output of the look-up table.

13. The processor element according to claim 9, further comprising
a multiplexer including a line for bypassing the look-up table, and configured to select the line and an output of the look-up table.

14. The processor element according to claim 10, further comprising
a multiplexer including a line for bypassing the look-up table, and configured to select the line and an output of the look-up table.

15. The processor element according to claim 12, further comprising
an ALU to be generated by high-level synthesis, and a register, wherein
the multiplexer is connected to an output of the look-up table, a line for bypassing the look-up table, and an output of the ALU.

16. The processor element according to claim 13, further comprising
an ALU to be generated by high-level synthesis, and a register, wherein
the multiplexer is connected to an output of the look-up table, a line for bypassing the look-up table, and an output of the ALU.

17. The processor element according to claim 14, further comprising
an ALU to be generated by high-level synthesis, and a register, wherein
the multiplexer is connected to an output of the look-up table, a line for bypassing the look-up table, and an output of the ALU.

18. A programmable device comprising:
a plurality of processor elements, wherein the plurality of the processor elements are disposed adjacent to one another, and the plurality of processor elements comprising:
an arithmetic unit that performs arithmetic processing based on a function in which an instruction set generated according to a program is mounted;
a register that stores an argument of the function;
a first bypass switch that switches whether to bypass the arithmetic unit
a second bypass switch that switches whether to bypass the register;
a connection setting unit that switches connection of a function unit being a pair of the register and the arithmetic unit
a multiplexer that switches an input to the connection setting unit
a demultiplexer that switches an output destination of an output from the connection setting unit
a selection unit that performs, according to a state, switching of the first bypass switch, the second bypass switch, the connection setting unit, a multiplexer, and a demultiplexer; and
wherein the selection unit is a finite state machine to be generated according to an application by high-level synthesis; and
the plurality of the processor elements that are not adjacent to one another are not directly connected, and processor elements adjacent to one another are connected to one another.

* * * * *